May 10, 1927.  1,627,742
J. J. JONES
BROILER
Filed June 7, 1924   2 Sheets-Sheet 1

INVENTOR
James J. Jones
BY
HIS ATTORNEYS

May 10, 1927.

J. J. JONES

BROILER

Filed June 7, 1924

INVENTOR
James J. Jones
BY
HIS ATTORNEYS

Patented May 10, 1927.

1,627,742

UNITED STATES PATENT OFFICE.

JAMES J. JONES, OF NEW YORK, N. Y.

BROILER.

Application filed June 7, 1924. Serial No. 718,436.

My present invention relates to an improvement in broilers, and the object thereof is the provision of a culinary utensil for broiling purposes in the use of which the grease and fats from meat, fish or other broiled foods are caused to travel in predetermined paths and collected so as to prevent the same from falling into the fire and burning whereby the disagreeable smoke and accompanying odors from the burning of grease are prevented and the foods properly broiled. In the use of this type of broiler, as will be understood, the natural juices of the meats, fish or other articles of food are retained almost entirely within the same.

In carrying out the invention I employ any suitable frame member to which is attached, removably or otherwise, a broiler plate preferably made of corrugated material in such a manner that the upper and lower portions of the corrugations are connected by oppositely disposed walls in which there are suitably spaced holes for the passage of the heat. In the frame I also employ a heat regulator and distributor member in which there are also series of holes so arranged that they may be placed to register substantially with the openings or holes in the walls of the corrugated broiler plate or may be made to assume positions staggered in relationship to the holes in the walls of the broiler plate so as to regulate and control the passage of the heat from the fire through the distributor plate and to the broiler plate and through the openings therein, as will be hereinafter more particularly described.

Figure 1:
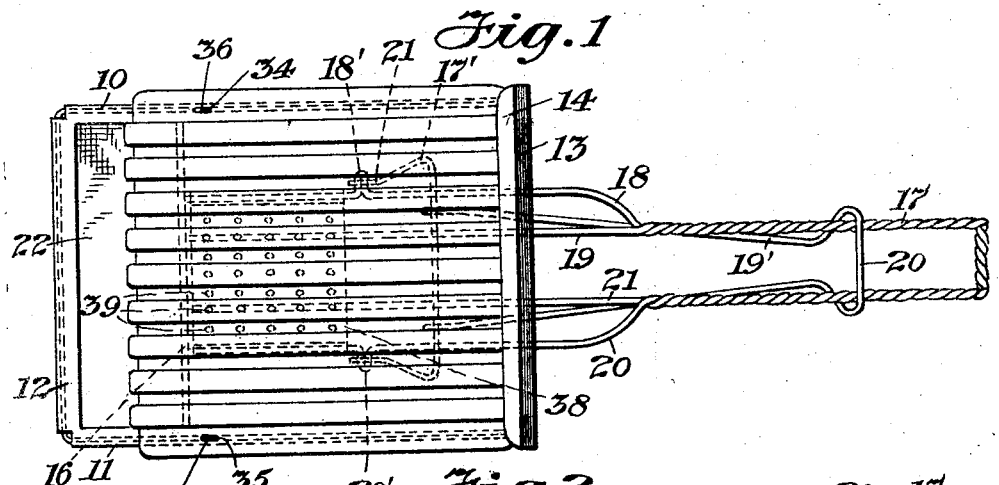
Fig. 1 is a plan of one form of broiler made in accordance with my invention.
Figure 2:
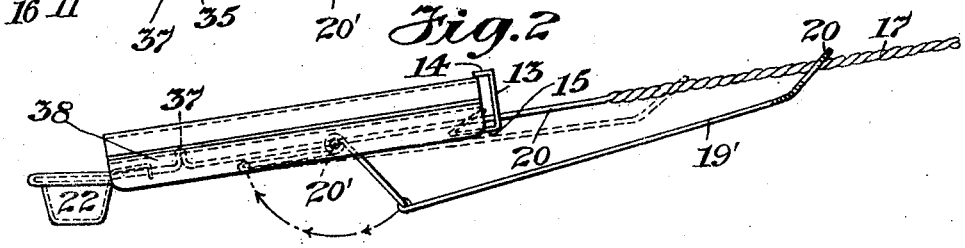
Fig. 2 is a side elevation of the same.
Figure 3:
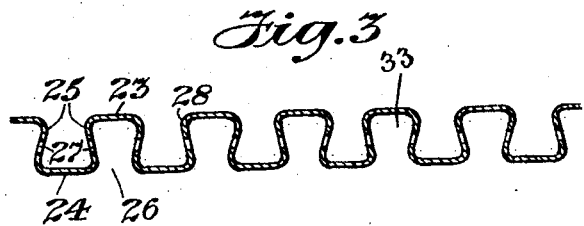
Fig. 3 is an enlarged section showing the manner in which the corrugations in the broiler plate are formed.

Referring to the drawing and particularly to Figs. 1, 2 and 3, it will be seen that in carrying out the invention the broiler as illustrated in these figures includes a suitable frame comprising side rails 10 and 11, an end rail 12, a head piece 13 having flanges 14 and 15. Extending across the frame there is a cross rail 16 and suitably connected to the head piece there is a handle or bail 17. As illustrated the handle is constructed of twisted wire, the end portions of which as shown at 18, 19, 20 and 21 extend through and are connected to the head member 13, the outer members 18 and 20 being suitably secured at their extremities to the cross rail 16. In a suitable position the member 18 is provided with a lug 18', and similarly the member 20 with a lug 20'. These lugs act as trunnions for a bail 17' to which there is secured a loop 19' which is slidable on the handle 17. Suitable stops are also employed to determine the movement of the bail 17 so that this acts as one of the bases or supports for the broiler when in use in order to maintain the same in an angular position relatively to the top of the stove or other heater on which the broiler is used. At the end opposite the handle as illustrated in this form of the invention, I employ a trough 22 which is adapted to fit over the side rails 10 and 11 and also over the end rail 12 and the cross rail 16 so as to be secured in position in the frame.

Associated with the frame, as hereinbefore described, I employ a broiler plate. This is preferably made of corrugated sheet metal, with the corrugations formed as shown, for example, in Fig. 3 in which the upper ends of the corrugations are designated at 23, the opposite ends or bases of the corrugations at 24 and the connecting walls at 25. The connecting walls 25 in each corrugation are preferably oppositely inclined as clearly indicated in Fig. 3 so that the opening 26 between the bases of adjacent corrugated sections is narrower than the upper end of the corrugations making the opposite edges thereof overhanging the base to a predetermined extent. In these inclined walls there are suitably spaced openings 27, and as illustrated the edges of the corrugations are preferably rounded as indicated at 28.

In this form of the invention the broiler plate may be provided in suitable positions with apertures 34 and 35 for the reception of lugs 36 and 37 provided for this purpose in the side rails 10 and 11, while one end of the broiler plate extends beneath the lug 14 in the head piece in order to maintain the broiler plate in position in the frame. Suitably connected to the frame and lug beneath the broiler plate I employ a heat distributor plate 38. This is provided with a series of holes or apertures 39 of any suitable configuration and the distributor plate is preferably shiftable in the frame and the apertures 39 so placed therein that these apertures may be caused to register substantially with the apertures in the broiler plate or may be made to assume a position staggered in relationship thereto whereby the flow of the heat may be controlled either passing directly through the apertures in the distributor plate to the spaces between the corrugations in the broiler plate or intermediate thereof so as to regulate the heat employed in the use of the broiler. The heat distributor plate 38 is preferably constructed to be connected to the outer members 18 and 20 of the frame, and is adjustable to position by being shiftable on these frame members or otherwise.

Figure 4:
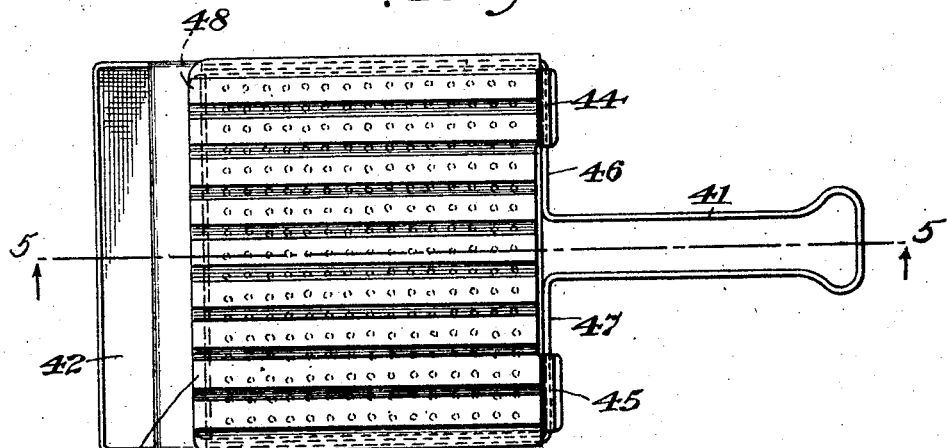
Fig. 4 is a plan of another form of the invention.
Figure 5:
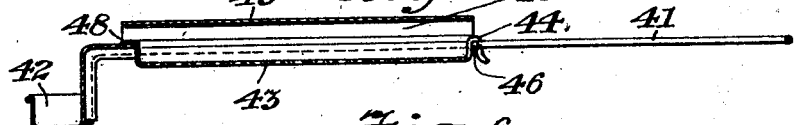
Fig. 5 is a section on line 5—5, Fig. 4.

In the form of the invention shown in Figs. 4 and 5, the frame member is designated by 40. This is provided at one end with a suitable handle 41 and at the opposite end with a trough 42. In this instance the distributor plate is designated by 43 and is fitted at the handle end of the broiler with lugs 44 and 45 which are turned over so as to hinge on the end rails 46 and 47 respectively, while at the opposite end this distributor plate is provided with a flange 48 adapted to fit over the inner end of the trough member 42. In this form of the invention the broiler plate is indicated at 49 and may be made in any of the forms hereinbefore described and suitably secured to the frame so as to be permanently connected thereto or removably attached thereto.

Figure 6:
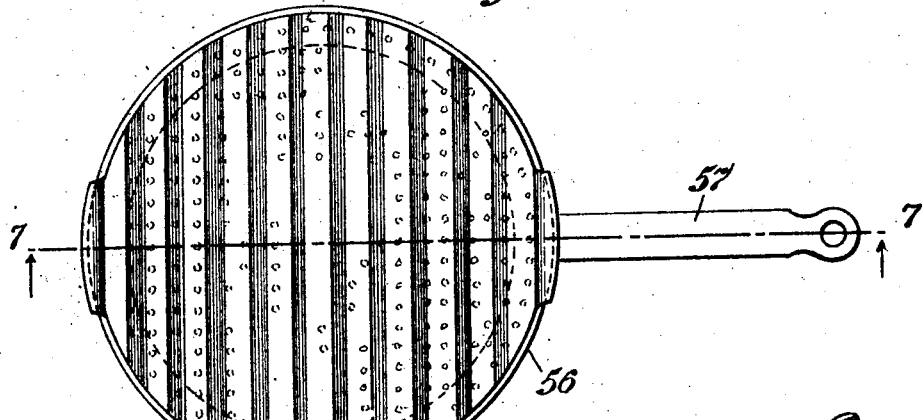
Fig. 6 is a plan of the third form of the invention.
Figure 7:
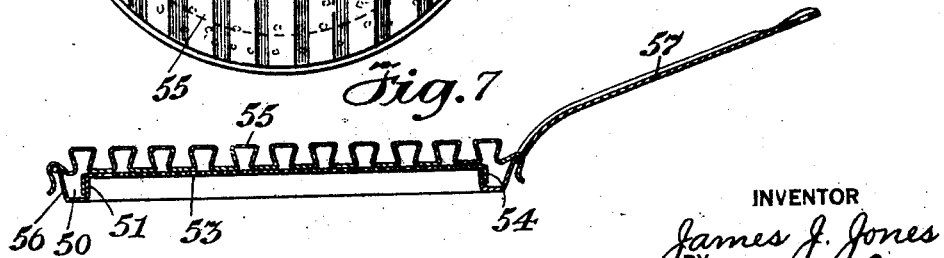
Fig. 7 is a section on line 7—7, Fig. 6.

In the form of the invention shown in Figs. 6 and 7, I employ a circular channel member 50 which, as will be understood, forms the trough for the reception of the fats and greases from the broiling operation. The channel member 50 is relatively narrow. The center thereof is open and over the inner member 51 of the channel there is fitted a heat distributor member 53. The heat distributor member 53 has a peripheral flange 54 which is of slightly greater diameter than that of the inner wall of the channel so that the same may be made to fit snugly over this inner wall of the channel. In this form of the invention the broiler plate is indicated at 55 and may be constructed in accordance with either form of the broiler member as hereinbefore described or otherwise and suitably secured to the upper edge of the outer wall 56 of the channel by snapping over the same or otherwise. In this form of the invention also the channel member may be fitted with a suitable handle 57.

From the foregoing description it will now be understood that the broiler made in accordance with my invention is one in the use of which the fats and greases due to the broiling of meats, fish or other food will run down over the rounded edges of the upper ends of the corrugations irrespective of which form of corrugation may be employed and into the troughs between the corrugations without passing through the openings in the walls of the corrugations so as to prevent these greases from falling into the fire and becoming ignited to burn and create a smoke and disagreeable odors. It will also be apparent that the broiler may be employed to equal advantage on a coal, gas, oil or electric or other stove, and that the heat may be so regulated as to properly broil the foods, retaining the juices therein and preventing the burning thereof.

I claim as my invention:

1. In a broiler, a frame, and a broiler member comprising a sheet of corrugated material, each corrugation having a flattened top and downwardly converging walls connecting the next succeeding corrugation and in which connecting walls there is a plurality of openings.

2. In a broiler, a frame, a corrugated sheet metal broiler member, the corrugations of which have flattened tops and bottoms and openings in the walls connecting the tops and bottoms, a heat distributor member also having a plurality of openings therein, the said heat distributor member being adjustable to position in the said frame so as to bring the openings therein into substantial alignment with the openings in the broiler member when the heat distributor member is in one position and to bring the openings in the heat distributor member into staggered positions relatively to the openings in the broiler member when the heat distributor member is in other positions in the frame, and means for securing the broiler member in position in the frame.

Signed by me this 6th day of June, 1924.

JAMES J. JONES.